US008655498B2

(12) United States Patent
Bronicki

(10) Patent No.: US 8,655,498 B2
(45) Date of Patent: Feb. 18, 2014

(54) METHOD AND SYSTEM FOR STANDBY POWER GENERATION SUPPLEMENTING SOLAR ARRAYS

(75) Inventor: Yoram Bronicki, Reno, NV (US)

(73) Assignee: Ormat Technologies Inc., Reno, NV (US)

( * ) Notice: Subject to any disclaimer, the term of this patent is extended or adjusted under 35 U.S.C. 154(b) by 135 days.

(21) Appl. No.: 13/236,149

(22) Filed: Sep. 19, 2011

(65) Prior Publication Data

US 2013/0073099 A1   Mar. 21, 2013

(51) Int. Cl.
*G06F 19/00* (2011.01)
(52) U.S. Cl.
USPC ............ 700/291; 700/287; 700/295; 706/42; 702/3
(58) Field of Classification Search
USPC ................. 700/287, 291, 295; 706/42; 702/3
See application file for complete search history.

(56) References Cited

U.S. PATENT DOCUMENTS

| 8,369,999 | B2 * | 2/2013 | Beck | 700/297 |
|---|---|---|---|---|
| 2010/0204844 | A1 * | 8/2010 | Rettger et al. | 700/291 |
| 2010/0309330 | A1 * | 12/2010 | Beck | 348/222.1 |
| 2011/0282514 | A1 * | 11/2011 | Ropp et al. | 700/297 |

OTHER PUBLICATIONS

"Stability and Power Quality Issues in Microgrids Under Weather Disturbances", Rikos et al, IEEE Journal of Selected Topics in Applied Earth Observations and Remote Sensing, vol. 1, No. 3, Sep. 2008.*

* cited by examiner

*Primary Examiner* — Michael D Masinick
(74) *Attorney, Agent, or Firm* — Oblon, Spivak, McClelland, Maier & Neustadt, L.L.P.

(57) ABSTRACT

A system for timely standby power generation supplementing a solar array during periods of cloud coverage, including a power plant comprising solar arrays for normal power production during periods of maximum or reduced solar influx, and distributed generating sets (DGS) for standby power generation to supplement the solar arrays during periods of cloud coverage. A weather station has sensors for acquiring real-time meteorological data in the vicinity of the power plant and a processor for processing the acquired meteorological data so as to generate data related to a solar influx reduction event at the power plant including an event starting time. A controller receives the event data from the processor and operating the DGS in response to the received event data.

6 Claims, 5 Drawing Sheets

METHOD AND SYSTEM FOR STANDBY POWER GENERATION SUPPLEMENTING SOLAR ARRAYS

FIELD

The present invention relates to the field of control systems. More particularly, the invention relates to a method and system for standby power generation supplementing solar arrays during periods of cloud coverage that would normally reduce solar influx.

BACKGROUND

The power output of an array of solar units, i.e. an array of photovoltaic (PV) panels or an array of panels for solar thermal power production, drops when the sun is covered during inclement weather or during a cloudy day. A dispatcher of a utility generally starts standby power systems to supplement or replace the power output of a solar array during periods of low or nonexistent solar influx.

The variability in power output of a solar unit array during periods of cloud coverage due to a drop in power output negatively influences the stability of the electric grid to which the utility supplies electricity, particularly when the power output of the utility constitutes a significant portion of the generating capacity of the electric grid. The ability of supplying a substantially constant level of electricity to a grid is becoming increasingly more important due to the growing emphasis placed on alternative energy sources by various governmental agencies. California utilities, for example, are obliged by state law to buy 33 percent of their power from renewable sources such as solar panels by 2020. Accordingly, utilities would have to be able to immediately supplement the power when the power output suddenly drops during periods of cloud coverage.

In a typical solar thermal based power plant, an array of parabolic mirrors concentrate solar energy onto receivers containing a heat transfer fluid. The solar energy is optimized by means of a central computerized tracking facility. The heat transfer fluid is circulated and heated through the receivers, and the heat is released to a series of heat exchangers to generate superheated steam. The superheated steam powers a turbogenerator to produce electricity delivered to an electric grid. An oil heater is employed to generate sufficiently hot heat transfer fluid which will produce superheated steam beyond daylight hours. Such backup or standby power systems suffer from a relatively slow starting time of approximately 30 minutes, and the power level of the grid will invariably drop during the interim period until the backup or standby power system becomes operational.

Another prior art solution to eliminate the hourly variations of power output is the use of batteries of a high storage capacity. No adjustment is required as a controller automatically limits the power produced by the batteries in response to the power produced by the solar array. However, the cost of these large batteries of a high storage capacity is prohibitive.

The present invention provides a method and system for standby power generation supplementing solar arrays during periods of cloud coverage without a significant power drop.

In addition, the present invention provides a method and system for standby power generation supplementing solar arrays during periods of cloud coverage that has a quicker startup time than that of a prior art system.

Furthermore, the present invention provides a method and system for standby power generation supplementing solar arrays during periods of cloud coverage that is cost effective.

Other advantages of the invention will become apparent as the description proceeds.

SUMMARY

The present invention provides a system for timely standby power generation supplementing a solar array during periods of cloud coverage, comprising a power plant comprising one or more solar arrays for normal power production during periods of maximum or reduced solar influx and one or more distributed generating sets (DGS) for standby power generation to supplement one or more solar arrays solar arrays during periods of cloud coverage; a weather station having one or more sensors for acquiring real-time meteorological data in the vicinity of said power plant and a processor for processing said acquired meteorological data so as to generate data related to a solar influx reduction event at said power plant including an event starting time; and a controller for receiving said event data from said processor via a communication link and for operating said one or more DGS in response to said received event data.

In one embodiment, the system further comprises an interface element through which electricity generated by the power plant is distributed to an electric grid, and a power sensor disposed adjacent to, and in electrical communication with, said interface element for detecting a power level of said generated electricity, wherein data being indicative of said detected power level being transmittable to the DGS controller to ensure that the power level power level of said generated electricity will remain substantially unaltered.

The present invention is also directed to a method for automatically determining a solar influx reduction event, comprising the steps of upwardly transmitting long-range pulses of radiation; receiving a reflection of said pulses; classifying a cloud by processing said received pulses; and generating data related to a solar influx reduction event in response to characteristics of said classified cloud.

The present invention is also directed to a method for timely standby power generation supplementing a solar array during periods of cloud coverage, comprising the steps of providing a weather station having one or more sensors for acquiring real-time meteorological data in the vicinity of a power plant comprising one or more solar arrays and one or more distributed generating sets (DGS); acquiring said meteorological data; processing said acquired meteorological data so as to generate data related to a solar influx reduction event at said power plant; and starting said one or more DGS in response to said generated event data.

DETAILED DESCRIPTION

The present invention provides a method and system for anticipating the time, duration and degree of power reduction at a solar power plant resulting from cloud coverage so that standby power systems will be timely set into operation.

Heretofore, plant operators of solar power plants have had to rely on weather forecasts made by remote weather stations to decide whether to start operation of standby power systems (hereinafter referred to as "distributed generating sets", or DGS for brevity). These remote weather forecasts are generally issued a day in advance while indicating only basic information such as the temperature, wind direction, air pressure, humidity, visibility, and whether there will be precipitation. However, the weather conditions and the amount of cloud coverage may vary considerably at the site of the power plant than what has been forecast at a remote location. Due to the uncertainty of the local visibility, little effective compensation can be made for such cloud coverage.

The present invention minimizes usage of standby power systems by positioning one or more weather stations at, or in close vicinity, to the power plant site. Information regarding cloud coverage overlying a solar array can be immediately acquired. Thus a standby power system can be just about instantly operated upon detection of reduced solar influx, or irradiance, on the solar array caused by increased cloud coverage, while ensuring that a close to constant level of electricity will be supplied to the grid.

Figure 1:
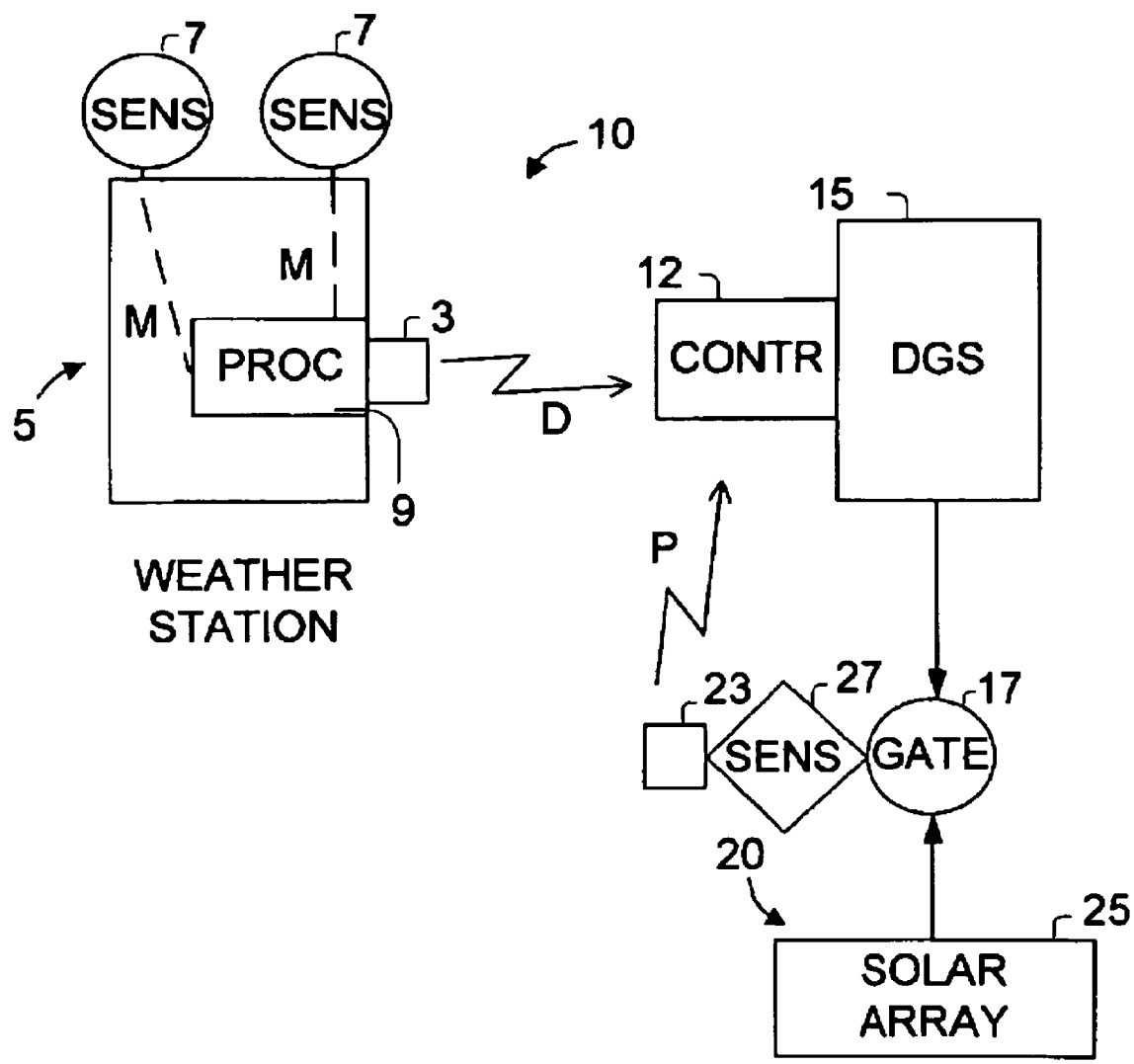
FIG. 1 is a schematic illustration of a system for timely standby power generation supplementing solar arrays during periods of cloud coverage, according to one embodiment of the present invention.

FIG. 1 schematically illustrates a system generally designated by numeral 10 for timely standby power generation supplementing solar arrays during periods of cloud coverage. System 10 comprises weather station 5 having one or more sensors 7 for acquiring real-time meteorological data M in the vicinity of a solar power plant and a processor 9 for processing the acquired meteorological data. A controller 12 for operating DGS 15 receives data D from processor 9 via communication link 3, e.g. wireless means or a wired connection.

The meteorological sensor 7 is selected from one or more of a thermometer, barometer, anemometer, and hygrometer for detecting the temperature, air pressure, wind speed and direction, and humidity, respectively, of the solar power plant surroundings, and preferably also includes a weather balloon or weather radar for determining the vertical structure of clouds and solar radiation influx reduction caused by clouds. A camera may also be employed.

Processor 9 is programmed with an algorithm, in response to the acquired meteorological data M, for an automated and accurate prediction in time of when solar influx onto the solar array will be reduced, as well as the degree and duration of the reduction in solar influx. Upon determination of the next event of solar influx reduction, processor 9 transmits to controller 12 data D which is indicative of the solar influx reduction event. Data D is generally representative of an event profile, defining the time, duration and degree of solar influx reduction. Controller 12 initiates operation of DGS 15 in such a way that the power level generated by power plant 20 remains substantially constant.

Power plant 20 comprises a plurality of electric conversion modules, including one or more solar arrays 25 for normal power production during periods of maximum or reduced solar influx and one or more DGS 15 for standby power generation to supplement the solar arrays 25 during periods of cloud coverage. The electricity generated by each of these modules is delivered to gate 17, which is an interface element through which the generated electricity is distributed to the electric grid. When array 25 is a photovoltaic array, the generated electricity is delivered directly to gate 17. When array 25 is used for solar thermal power production, a turbogenerator delivers the generated electricity to gate 17. A generator may be coupled to the turbine fed by the motive fluid of a solar array 25 so that the generated electricity is delivered to gate 17 as is the electricity generated by DGS 15 when used.

A power sensor 27 is disposed adjacent to, and in electrical communication with, gate 17 in order to detect the power level of the generated electricity distributed to the electric grid. Data P which is indicative of the power level of the generated electricity distributed to the grid is transmitted to DGS controller 12 via communication link 23 by wireless means or by a wired connection. Accordingly, controller 12 is adapted to startup DGS 15 at the starting time of the solar influx reduction event and at a power level and duration which correspond to the power level and duration, respectively, of the event so that the power level at gate 17 as indicated in data P will remain virtually unaltered. If a power plant operator decides to change the power level, data P will be modified and controller 12 will control DGS 15 to operate in such a manner so that the total power level generated by DGS 15 and by solar array 25 will be equal to the new target power level.

DGS 15 may be selected to provide a startup time of approximately 10 seconds, which is dramatically shorter than duration of the prior art. By providing such a quick startup time, the weather station may be stationed very close to the power plant and provide real-time solar influx reduction event data so that the DGS will be timely started without a significant power drop. A suitable DGS may a gas or diesel internal combustion engine which runs on natural gas, LPG, biodiesel, ethanol, or diesel fuel. The power level of DGS 15 may typically range from 10-200 MW.

A small battery or flywheel system may be used to cover short variations without requiring start up of standby generators.

FIGS. 2-5 illustrate various embodiments, respectively, of a solar array that may be employed in conjunction with the standby power generation system of the present invention.

Figure 2:
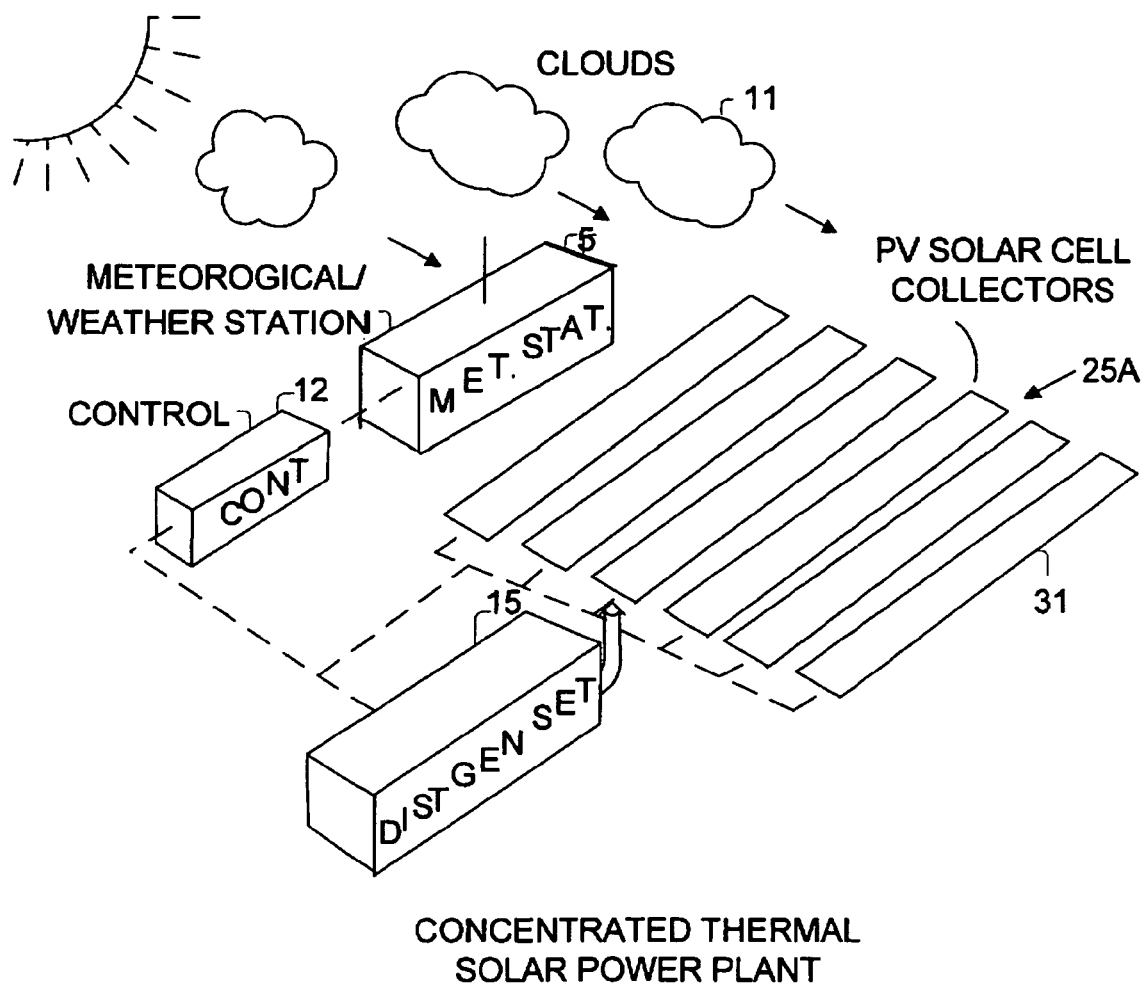
FIGS. 2-5 illustrate four embodiments, respectively, of a solar array for use in conjunction with the system of FIG. 1.

FIG. 2 illustrates an array 25A of photovoltaic cell collectors 31 for converting solar energy directly into electricity. When weather station 5 determines that clouds 11 will cover array 25A to reduce the solar influx provided by the sun 4, controller 12 commands DGS 15 to supplement the power level of the power plant.

Figure 3:
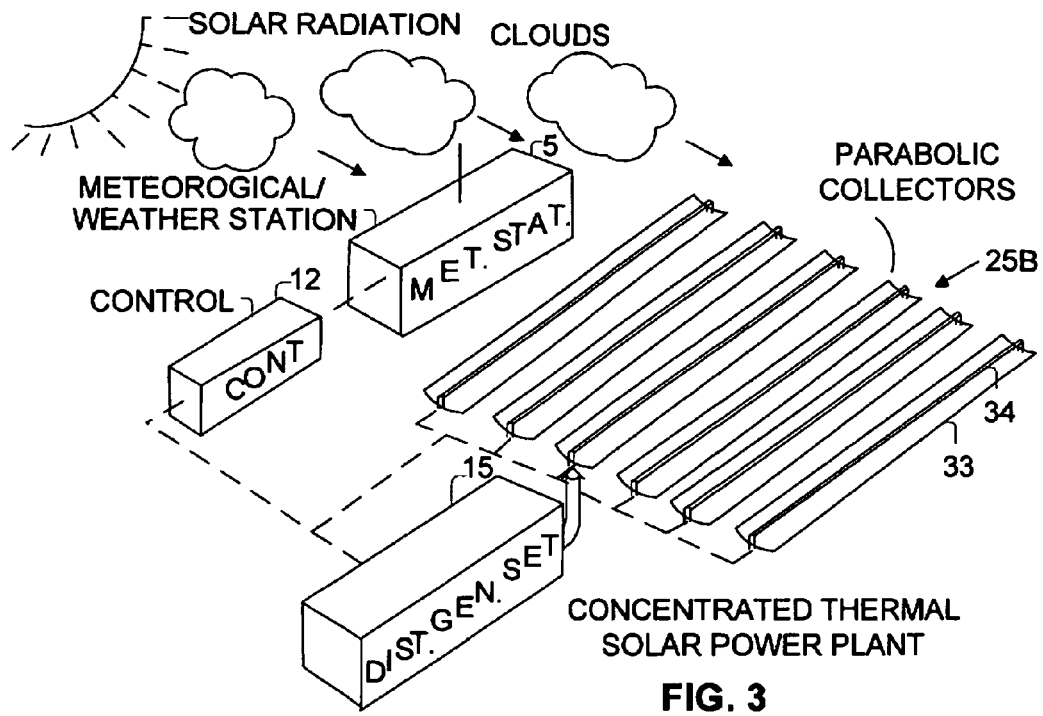

FIG. 3 illustrates an array 25B of parabolic solar collectors 33, each of which focuses solar radiation onto a pipe 34 through which a heat transfer fluid, usually an thermal oil, circulates and is heated so that its heat may be transferred by means of a heat exchanger to e.g. steam supplied to a turbine.

Figure 4:
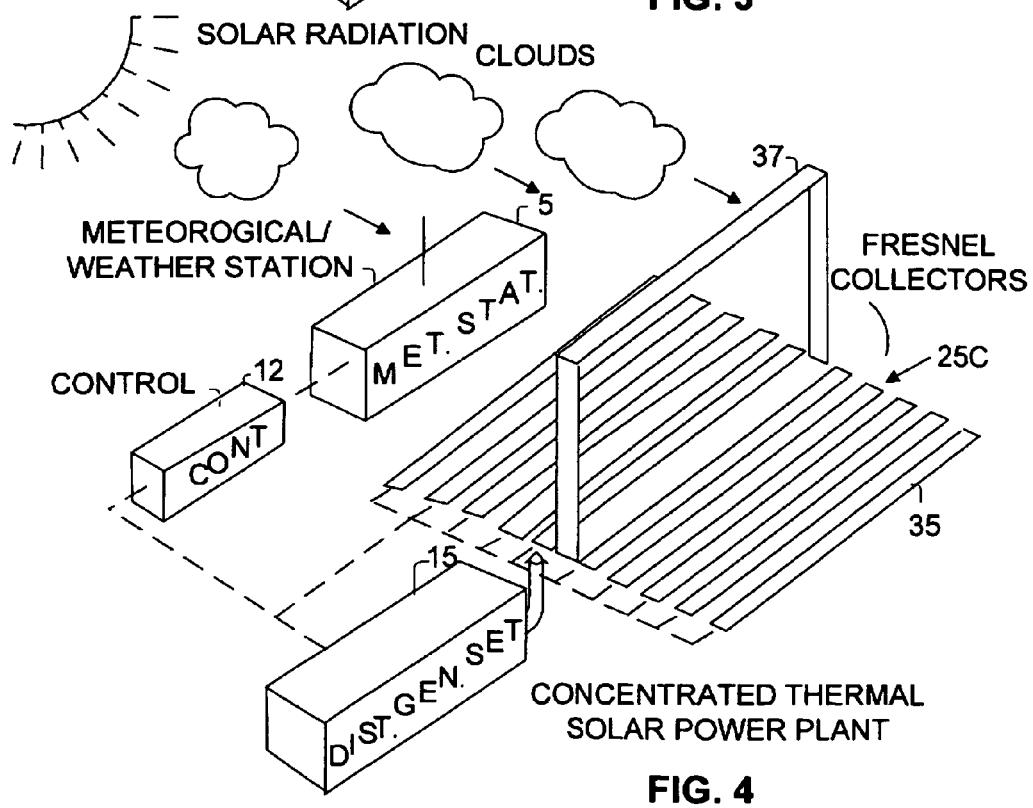

FIG. 4 illustrates an array 25C of Fresnel solar collectors made of a plurality of flat mirror segments 35, which concentrate sunlight onto a fixed horizontally disposed absorber tube 37. A heat transfer fluid circulates through absorber tube 37 and is heated so that its heat may be transferred by means of a heat exchanger to e.g. steam supplied to a turbine.

Figure 5:
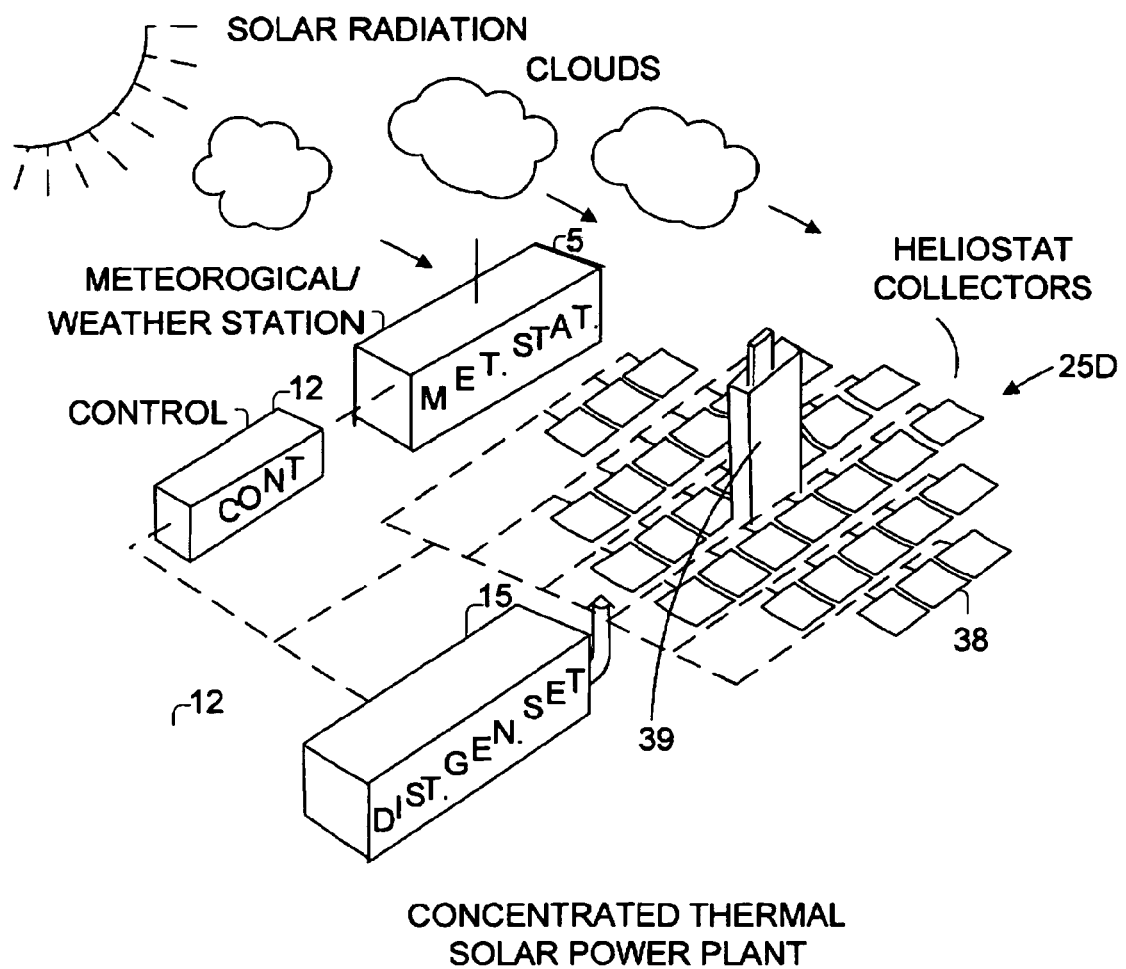

FIG. 5 illustrates an array 25D of heliostat solar collectors 38 which concentrate sunlight onto a vertically disposed station 39 at the top of the solar tower. Each solar collector 38 comprises a mirror which individually tracks the sun and focuses the solar radiation at station 39 at the top of the solar tower. Motive fluid in station 39 is heated in order to produce power by means of a turbine e.g. a steam turbine.

Figure 6:
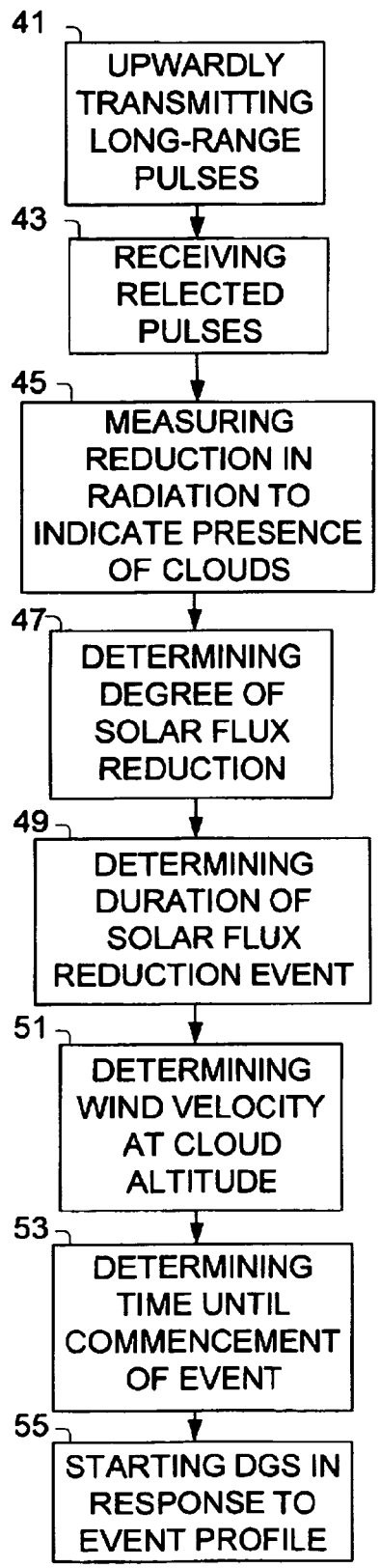
FIG. 6 is a method for automatically determining a solar influx reduction event.

The weather station is adapted to generate data related to a solar influx reduction event by automatically determining the structure of nearby clouds. As shown in FIG. 6, the presence of a cloud, e.g. a cumulus cloud is determined in step 41 by upwardly transmitting long-range pulses, e.g. ranging from 0.5-10 km, of a selected radiation level by means of a radar instrument for transmitting microwave radiation or by means of a LIDAR (light detection and ranging) instrument for transmitting laser pulses. The light reflected from the clouds is then received in step 43 by the radar instrument and a reduction in radiation is sensed in step 45, indicating the presence of a cloud. The degree of the anticipated solar influx reduction is determined in step 47 by taking into account the radiation of the transmitted pulses and the radiation of the received pulses. The radar pulses are repeatedly transmitted and the time elapsed until the radiation of the reflected light returns to the original selected level is measured in step 49, indicating the presence of distinct and separated cumulus cloud cells as well as the duration of a solar influx reduction event, i.e. a cloud lateral dimension or size. As cumulus clouds are known to be disposed at a low altitude ranging from 2000-3000 ft, an anemometer or any other suitable wind velocity sensor is positioned at such an altitude in order to determine the wind velocity of the cumulus cloud in step 51. The time until commencement of a solar influx reduction event, i.e. its starting time, is determined in step 53 by dividing the cloud wind velocity by the distance from the weather station to the solar array. The DGS is then started in step 55 in response to the event profile.

Other types of clouds may also be classified by determining the altitude of the cloud base and the altitude of the cloud top. For example, laser pulses transmitted by a LIDAR instrument may be transmitted so as to measure the backscatter, e.g. a laser ceilometer, a micropulse LIDAR and a Raman LIDAR. By using the speed of light, the thickness and height about ground of a cloud may be determined.

The following example describes the typical operation of the system of the present invention.

EXAMPLE

The local weather station detects that cumulus clouds at an altitude of 750 m are at a distance of 3 km from the power plant. The weather station further estimates by using a radar system that the clouds will bring about a 30% reduction in solar radiation at ground level. The wind velocity at the altitude is measured to be 5 m/s, and it is therefore estimated that that the clouds will reach the power plant in about 10 minutes. The distributed generator set is consequently started and produces the predicted lost power in order to compensate for the reduction in solar derived power caused by the cloud coverage.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A system for timely standby power generation supplementing a solar array during periods of cloud coverage, comprising:
   a power plant comprising one or more solar arrays for normal power production during periods of maximum or reduced solar influx;
   one or more distributed generating sets (DGS) having a predetermined startup time, for generating standby power generation to supplement the one or more solar arrays during periods of cloud coverage;
   a plurality of weather stations, each having one or more sensors for acquiring real-time meteorological data in the vicinity of said power plant and a processor for processing said acquired meteorological data so as to generate data related to a solar influx reduction event at said power plant including an event starting time, wherein each of said weather stations is positioned at a location relative to said power plant such that the event starting time, subsequent to the meteorological data acquisition, will be greater than the predetermined startup time; and
   a controller for receiving said event data from said processor via a communication link and for operating said one or more DGS to generate standby power to supplement the one or more solar arrays in response to said received event data.

2. The system according to claim 1, further comprising an interface element through which electricity generated by the power plant is distributed to an electric grid, and a power sensor disposed adjacent to, and in electrical communication with, said interface element for detecting a power level of said generated electricity, wherein data being indicative of said detected power level being transmittable to the DGS controller to ensure that the power level power level of said generated electricity will remain virtually unaltered.

3. A method for timely standby power generation supplementing a solar array during periods of cloud coverage, comprising the steps of:
   providing a power plant comprising one or more solar arrays;
   providing one or more distributed generating sets (DGS) for generating standby power to supplement the one or more solar arrays, wherein the one or more distributed generating sets (DGS) have a predetermined startup time;
   providing a plurality of weather stations, each having one or more sensors for acquiring real-time meteorological data in the vicinity of the power plant;
   acquiring said meteorological data;
   processing said acquired meteorological data so as to generate data related to a solar influx reduction event at said power plant, including an event starting time, wherein said step of providing a plurality of weather stations comprises positioning each of said weather stations at a location relative to said power plant such that the event starting time, subsequent to the meteorological data acquisition, will be greater than the predetermined startup time; and
   starting said one or more DGS in response to said generated event data, to generate standby power to supplement the one or more solar arrays.

4. The method according to claim 3, wherein:
   the step of acquiring meteorological data comprises upwardly transmitting long-range pulses of radiation, and receiving a reflection of said pulses; and
   the step of processing said acquired meteorological data comprises classifying a cloud by processing said received pulses, and generating data related to a solar influx reduction event in response to characteristics of said classified cloud.

5. The system according to claim 1, wherein each of said weather stations is positioned at a location relative to said power plant such that the event starting time, subsequent to the meteorological data acquisition, will substantially correspond to the predetermined startup time.

6. The method according to claim 3, wherein said step of providing a plurality of weather stations comprises positioning each of said weather stations at a location relative to said power plant such that the event starting time, subsequent to the meteorological data acquisition, will substantially correspond to the predetermined startup time.

* * * * *